United States Patent [19]
Niese

[11] Patent Number: 4,623,968
[45] Date of Patent: Nov. 18, 1986

[54] STRUCTURED DESIGN AND DECENTRALIZED CONTROL OF PRODUCTION INSTALLATIONS

[75] Inventor: Manfred Niese, Leverkusen, Fed. Rep. of Germany

[73] Assignee: Bayer Aktiengesellschaft, Leverkusen, Fed. Rep. of Germany

[21] Appl. No.: 521,771

[22] Filed: Aug. 9, 1983

[30] Foreign Application Priority Data

Aug. 31, 1982 [DE] Fed. Rep. of Germany ....... 3232401

[51] Int. Cl.[4] ................ G05B 11/32; G06F 15/46
[52] U.S. Cl. ................ 364/500; 137/624.18; 364/140; 364/496
[58] Field of Search ............ 364/496, 498, 500, 502; 137/263, 266, 571, 624.11, 624.12, 624.18, 624.20

[56] References Cited

U.S. PATENT DOCUMENTS

| | | | |
|---|---|---|---|
| 3,805,821 | 4/1974 | Bitner | 137/263 X |
| 3,814,916 | 6/1974 | Sweeney, Jr. | 364/500 |
| 4,175,283 | 11/1979 | Buchwald et al. | 364/500 X |
| 4,180,083 | 12/1979 | Miyaoka et al. | 137/571 X |
| 4,208,712 | 6/1980 | Deutsch | 364/500 X |
| 4,347,564 | 8/1982 | Sugano et al. | 364/132 |
| 4,392,514 | 7/1983 | Farley et al. | 137/624.2 |
| 4,427,298 | 1/1984 | Tahy et al. | 137/624.18 |

FOREIGN PATENT DOCUMENTS

| | | | |
|---|---|---|---|
| 1360230 | 3/1964 | France | 364/500 |
| 601699 | 5/1978 | U.S.S.R. | 364/500 |

*Primary Examiner*—Felix D. Gruber
*Attorney, Agent, or Firm*—Sprung Horn Kramer & Woods

[57] ABSTRACT

A process for controlling an installation for the production of chemical substances sub-divides the process control into control regions which are controlled in a decentralized manner and in which a closed divisional function is carried out independently in each case. The working condition of a control region is determined by operating types which may be initially given and by a limited number of discrete operating values. The process parameters determining the control region condition are allocated to each operating value in one formulation. These parameters are adjusted by means of suitable devices. In the event of deviations of a parameter, the other formulation parameters are not adapted, but the procedure is interrupted if the permissible parameter limits are exceeded. Increases in the operating values are only permissible from a quasi-stationary working condition which is characterized by a normal signal formed from the process measurement values. In several control regions, the necessary flexibility is secured by a flow decoupling by means of buffers. Similar control regions are combined into groups, and different groups are combined into main groups. Groups and main groups are controlled together and are decoupled from one another by strategic buffers.

13 Claims, 15 Drawing Figures

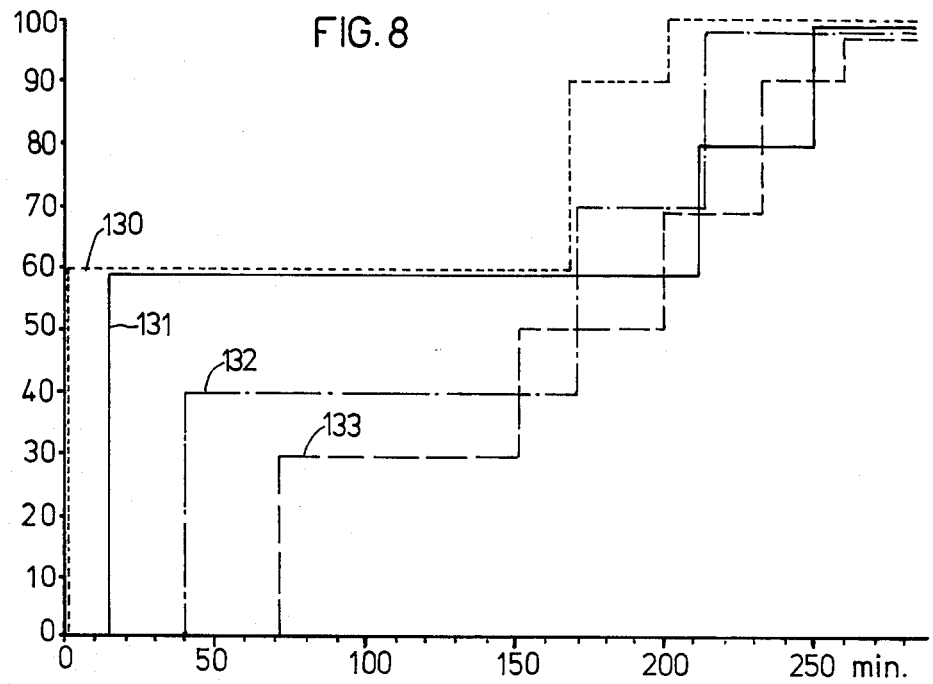
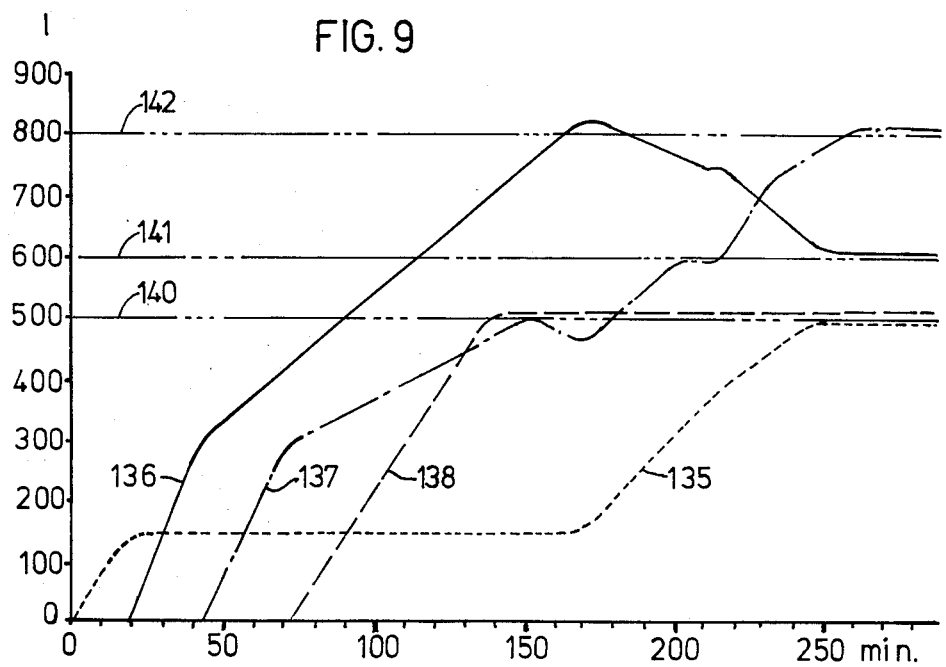

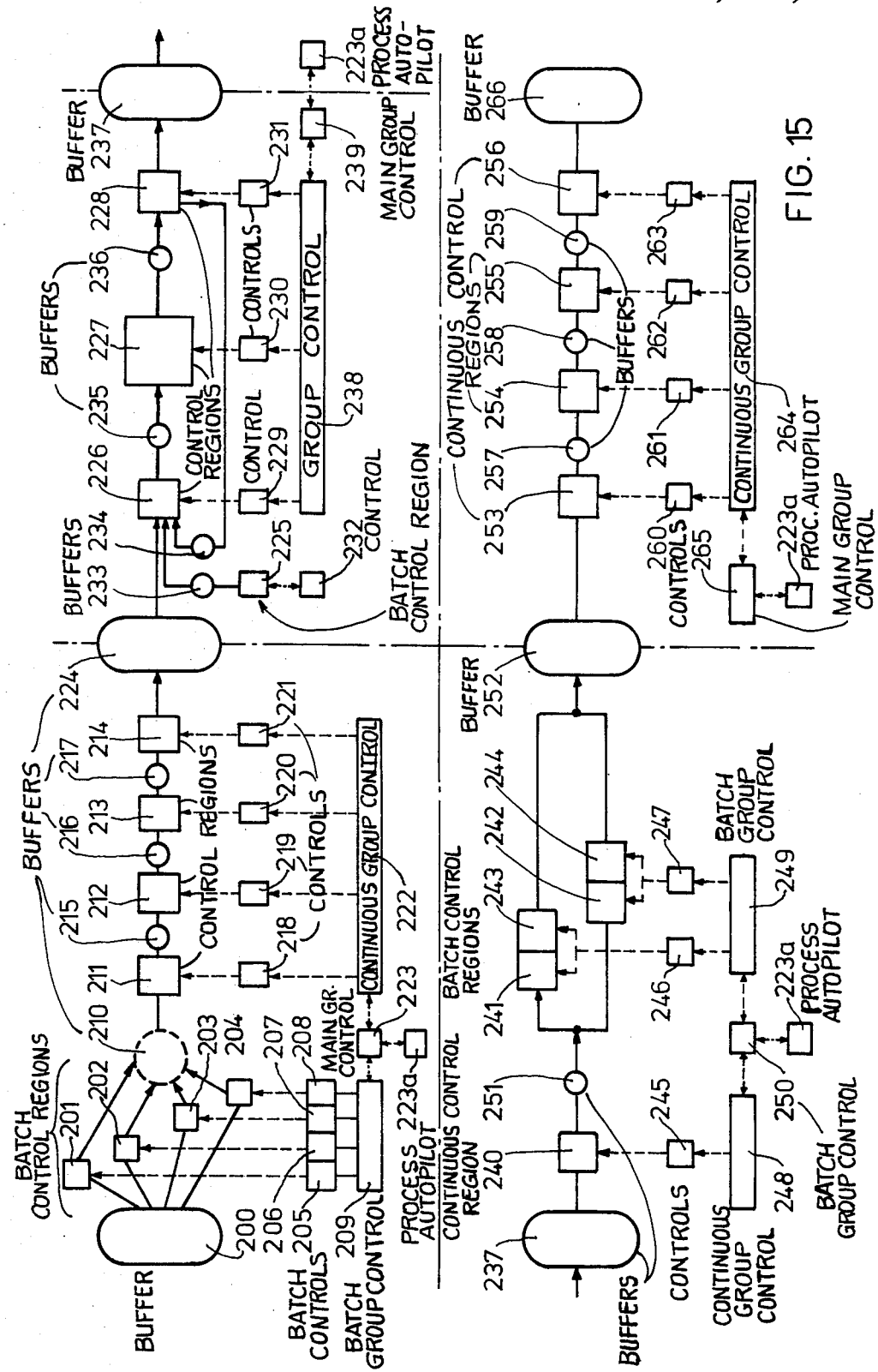

STRUCTURED DESIGN AND DECENTRALIZED CONTROL OF PRODUCTION INSTALLATIONS

BACKGROUND OF THE INVENTION

This invention relates to an installation for the production of chemical substances, structured in continuously and/or sequentially operating control regions for individual divisional functions, containing measurement devices for the process parameters, regulation devices, switching equipment for the flow paths which occur in different types of operation, and safety devices. The invention also relates to a process for controlling chemical production installations, in which divisional functions are carried out in continuous and/or batch control regions, the operating value and type of operation of which may be changed, and these control regions cooperate serially and/or in parallel.

Attempts are constantly being made during the operation of chemical production installations to minimise the times in which the installations cannot be operated with the necessary desired capacity owing to disturbances or changes in the type of operation. Even in methods which only have a few divisional processes, it is not known, even with the use of electronic data processing equipment, how an optimum strategy may be achieved for attaining the desired capacity for the complete method. Although all the individual data necessary for controlling the method are known, the cooperation of different process groups is usually so minimally flexible that considerable safety time allowances become indispensable for unforeseeable deviations and disturbances during the divisional functions. It is often left to the subtle intuition of the personnel to coordinate the cooperation of the divisional processes. According to experience, the operations of starting up and changes in load are particularly associated with disturbances and interruptions, for example because individual regions cannot produce the required capacity at the right time, or the adaptation of the operational parameters is too slow, which also results in a run-out from the desired region and, for the most part, results in a correction which is expensive in terms of time, possibly even in the re-start of the intended procedure. In the case of firmly planned reserve times, a starting up operation or a change in load of the installation cannot be achieved, even according to definition, with the shortest possible procedure time.

No control process and no installation adjusted thereto is known, in which optimum strategies may be achieved for a maximum capacity of the complete process upon changing the operating condition in one, several or all divisional processes.

SUMMARY OF THE INVENTION

An object of the present invention is to design and construct a production installation such that, in the event of deviations in the normal load operation and in the event of changes in the type of operation or load, a control process may be used, with which the times at which the installation must be worked with a reduced capacity may be minimised, without forfeiting flexibility and safety of the installation, and to propose a control process which allows changes in the load and type of operation without the loss of safety and adaptability and thereby, if required, minimises the transition periods.

This object is achieved by an installation which is characterised in that there is provided within each continuous or batch control region a forcibly coupled volume flow without an intermediate buffer action; each control region may be controlled independently by a control system; buffers are provided for flow decoupling before and after each control region; possibilities of intervening in the working behaviour of a control region are restricted to only the type of operation and the operating value; the operating value can only adopt a number of discrete values, based on the nominal capacity of the installation; and flow path changes and process parameter changes are coupled with changes in the type of operation and operating value according to the formulation.

The object is achieved by a process in which each control region is decoupled in terms of volume flow and is controlled independently; only the type of operation and the operating value selected from a discrete number of operating value stages may be initially given to each control region; for each operating value or for each change in the type of operation, all process-conditioned process parameters and flow paths are changed according to the formulation; changes in the operating value with respect to the operating value step height and jump waiting time, restricted by the process, may only be introduced from a quasi-stationary condition and if it is not prevented by the buffer levels upstream and downstream of the control region, the quasi-stationary condition of a control region being characterised by a signal which occurs for a sufficient length of time and which is produced when all the operational parameters of the control region lie within process-conditioned normal condition limits which are initially given.

According to the present invention, each divisional procedure of the complete process carried out in one control region may be carried out in each working condition according to optimally developed instructions for this control region, independently of the procedures in the other control regions of the process, and the optimisation ability of previous or subsequent working procedures is not impaired by the optimisation of an individual procedure. Only as a result of this is a control technique achieved which may be surveyed and is easier in many cases. It is particularly advantageous that the installation is equally well suited for information processing and control interventions by operating personnel as by process control systems. It is distinguished precisely by the fact that the same strategy is present during manual operation and EDP control and a control change is possible at any time between the personnel and the EDP equipment and there can be no mistake about the condition and the intervention possibilities, but clear measures may always be taken. An installation having the control structure according to the present invention may easily be passed over to a process control system, as is conventional in the case of large installations, as a clear identification of the process conditions, and as a reproducible control of the process functions is ensured.

An essential structural feature of this invention is the consequent sub-division of the process or the structuring of the installation into decentralised independent control regions. One control region contains a closed working procedure having charging material(s) at the beginning and an end product at the outlet. The process characterises the measures necessary for this purpose. The type and extent of the measures is established in the formulation. The formulation contains the materials to be used in the process and the quantities thereof, as well as the physical working conditions. The control region is designed for a closed function, which does not have to mean that apparatus of a control region cannot also be used for other process functions in the case of suitability and a different formulation. There prevails between the apparatus of one control region a forced volume flow coupling, as a result of which, upon changing the type of operation or the operating value, all the apparatus simultaneously adopt the same type of operation and the same operating value. A certain time delay in the mass flow may be unavoidable thereby. A decoupling of the control region-volume flow in the previous and subsequent control region is achieved by buffers (empty storage tanks) at the input and output of the control region. No intermediate buffer action of the volume flow may be carried out in the control region.

Each control region is controlled independently and autonomously from the complete process owing to the volume flow decoupling and also to the extent of the degree of filling of the coupling buffers. The control input of each control region is the control region operating value. The operating value is a rating for the complete installation. A control region operating value of 100 corresponds to the capacity of the control region which is necessary for achieving the nominal capacity of the installation.

The operating value range between the minimum operating value which will be 0 in many cases (however, in certain processes, a finite operating value may be indispensible), and the maximum operating value which gives the possible overload limit, is sub-divided into discrete operating value stages, the width of which is selected such that the parameter values defined by the operating values may be characterised by measurement values which clearly lie outside the error limits determined by the measurement devices which are used. A 10% grading suffices in most cases.

The control region operating values can only adopt one of these operating values. A very specific volume flow in a control region corresponds to each operating value of this control region. However, due to the formulation, the volume flows in different control regions may differ with the same operating values. During the course of the process, the operating values in each control region may differ. One control region operating value may be greater than, the same as or smaller than the desired operating value of the process.

The pre-setting of a desired operating value for a control region is associated according to the present invention with the pre-setting of all the other process parameters stipulated by the process, in addition to the determination of the input volume flow. The exact adjustment of the pre-given parameters may be supported by regulations, and this regulation can only be controlled by the measured values of the very parameters to be regulated. An influencing by other measurement parameters is not permitted. In particular, the desired value of the volume flow is not directly dependent on the level of the input or output buffers of the control region. These levels are considered when determining the operating value to be initially given for the control region. If a conformity cannot be achieved between the actual parameters and the desired parameters, other measures, in particular other operating value changes are prevented, and it is the task of the operating personnel to clarify the causes of these deviations which mainly comprise malfunctions of the technical apparatus which is used or defective charging materials. The deviation is adjusted by correcting the technical malfunction, and by a correction of the substance values or by a new operating value formulation, but not by influencing individual parameters, or a new operating value of the valid operating value formulation.

It is found that as a result of these measures, errors are eliminated much more quickly and transition procedures during starting, a change in load and continued operation may still be surveyed after interruptions.

One operating value is to be clearly allocated to each control region, in continuous operation as in batch operation. In the case of continuous control regions, the operating value determines the volume flow, and changes in the flow take place simultaneously in all parts of the control region, (a slight time delay due to inertia cannot be ruled out), and rigid, nondecoupled flow feed-backs are only permitted within the buffer limits. In the case of batch control regions, the operating value determines the starting spacing of batch parts to be newly used.

Backflows which are to be supplied to other control regions must be decoupled via their own buffers. In all control stages (control region, group, main group), the volume flow is the main process indicator which is directly linked to the operating value via the formulation.

The interaction of the volume flow with the working volume of the apparatus produces the time behaviour of the working procedure which is carried out in the apparatus. The procedure itself is produced in chemical processes by the quantities of substance which occur in this volume flow and which may be characterised by density or concentration parameters, and thus the substance flows are established and known in production processes as well. Similarly, the energy flows are coupled with the volume flow. Substance charge and conversion quantities may be derived from flow integrals.

The (residence) time behaviour in a control region is given by the quotient of the working volume and the output volume flow. The complete time behaviour of a control region is determined, in the case of several working apparatus, by the partial apparatus which has the longest residence time. The following relation is produced as an example of a residence time-dependent concentration build-up $C_x$ in a continuous installation, with a constant, stationary volume flow:

$$C_x = C_0 + (C_e - C_0)[1 - \exp(-t/TV)],$$

wherein $C_e$ represents the concentration of the input flow, $C_0$ represents the starting concentration, TV represents the residence time which is the quotient of the working volume and the output volume flow and t represents the time which has elapsed.

The working behaviour of control regions may be clearly described by a few types of operation which may be sub-divided into those without and those with operating value changes. Starting up with product, change in load and continued operation after interruption are associated with operating value changes, whereas apparatus standstill, starting of the apparatus, stationary operation with a constant operating value (disturbance), interruption and stopping of the apparatus are types of operation without externally pre-settable operating values. In the case of the types of transition operation, restrictions from the process (operating value, step height and jump waiting time) as well as from the actual process parameters (presence of a normal condition signal within limits to be pre-set over a period of time to be pre-set) are to be considered. The possible operation types are the following:

STOP: Standstill of the apparatus; condition before starting and after stopping;

VORB: Putting into operation of the apparatus; production of the working readiness for taking up the work of the apparatus (production);

ANFA: Starting;start of the product supply and optionally of the reaction; carrying out operating value strategies;

NORM: Stationary condition of the installation if the operating value and the desired operating value are the same;

AEND: Change in load; production of the stationary working condition (NORM) with a changed desired operating value; optionally carrying out operating value strategies;

HALT: Interruption of the working procedure by blocking the product supply (volume flow) while simultaneously retaining the other process parameters corresponding to the hitherto prevailing operating value;

HALT 2: Interruption in the working procedure by blocking the product supply (volume flow) and changing the other process parameters to safety values;

WEIL: Continued operation after interruption; resumption of the same working condition which was interrupted by HALT/HALT 2; carrying out operating value strategies;

ABFA: Stopping, termination of the working procedure; emptying and putting the apparatus out of operation.

For all operation types, apart from VORB (putting the apparatus into operation), the definitions provided above contain standard instructions which are used for all control regions in manual operation as well as in fully-automated operation. The instructions for the type of operation are adapted to a specific control region function by stating numerical parameters for strategy courses, naming relevant measurement signals and relevant measurement value limits and setting up flow path controls.

The actual capacity level of each control region and of the complete installation may always be directly recognised by the clear structuring of the installation and by the decentralised independent process control. Whether the installation is worked in manual or computer operation makes no difference. The control methodology is identical in both cases.

According to the present invention, operating value changes are only carried out in stages in the installation. This operation may be termed quasi-stationary operating value strategy. During the term of a divisional step, the values of the control parameters contained in the formulation are maintained unchanged in time, which values are allocated to the respective operating value. The greatest possible operating value step height must be adapted to the working behaviour of the control regions, and operating value gradings of from 10 to 30 are preferred. The length of time until another operating value jump is possible depends, in chemical procedures, on the residence time, i.e. on the achievement of a quasistationary concentration condition in the apparatus (about 3 to 4 times TV), and in technical procedures, on the greatest dead time of the regulating devices which are used in the control region, the time until a quasi-stationary working condition of the regulating devices is attained.

Furthermore, the transition to a higher operating value depends on the presence of a normal condition signal which is produced if the measured values of the procedure-relevant parameters lie within narrow limits after the expiration of the jump waiting time over a certain period of time. These limits are not identical to alarm and safety limiting values. This time-rated normal condition signal states that all the regulating procedures have been concluded. This ensures a well defined initial condition of the control region for every other partial load change and thus an increase in the process safety.

The normal condition signal does not play a part in conventional control processes. In the process according to the present invention, there are, of course, also alarm and safety limits with, if necessary, automatic switch-off. If such limits are exceeded, the process has to be checked, but in the control process, no intervention is made, in principle, in the formulation, but the volume flow is interrupted in the control region by switching interventions, but all the other process parameters are maintained. In the case of longer lasting disturbances, a separate (operating value) formulation may be arranged for this control region on instructions or on automatic intervention, with which formulation all the process parameters are set at safety desired values.

In the event of disturbances in a control region, it is possible, if permitted by the product or empty volume supplies in the coupling buffers, to further operate the other control regions of the process possibly with a reduced operating value and to repair or change the disturbed control region which, in conventional installations, would result more quickly and more frequently in a standstill of the complete process.

The independent devices in each control region carry out all the interventions autonomously in the control region. Such interventions are caused by control instructions of the personnel or of a process control system, via regulators for analog adjustments of physical magnitudes and by digital flow path controls for processing switching procedures which depend on the type of operation.

Flow paths for substance and energy carriers (cooling water, steam, heat carriers, switching conditions of electrical heatings) are established in terms of apparatus for all process conditions (types of operation). These flow paths are opened or blocked by switching members (valves, pumps etc.). The flow paths are specific to the type of operation and are activated depending on the type of operation which is occurring or is to be produced. Furthermore, all the active control devices (regulators) which are required in the relevant type of operation are included in this activation.

All these switching conditions which are often very numerous may be connected clearly and at a low expense via a switching matrix which is dependent on the type of operation.

The digital flow path connection processes together all the signals which initiate interruptions produced by the process and causes all the interventions in the devices installed in the control region.

The signals which initiate interruptions are subdivided into two groups during processing:

(a) Unconditional interruption signals: upon the occurrence thereof, the control region must not operate; continued operation is possible when none of these signals is present;

(b) Blockable interruption signals: these signals may be locked temporarily during continued operation or in certain other types of operation (starting, stopping), and they do not then have an interrupting effect.

Sequential procedures take place in batch processes. Such procedures may also occur in the case of continuous control regions, in certain types of operation, for example during starting. As a result of this, periodic changes in the buffer content take place in the upstreamand downstream-connected buffers.

If a continuous control region is connected upstream or downstream of the batch control region, a stationary input flow and a periodic output flow, or a periodic input flow or a stationary output flow is produced in the coupling buffer of both regions.

A control region operating value also applies to the batch control region which is located in the control system, which operating value determines in this case the starting spacing between two successive batch charges and characterises the possible stationary input or output volume flow from the coupling buffer. The course of the batch sequence is effected in an always constant manner by a separate control. At the end of this sequence, working conditions exist which are denoted with batch conditions analogously to the types of operation of the continuous control regions:

LAUF: Normal course of the step sequence
HALT: Interruption (during disturbance)
WEIL: Continued operation after interruption in interrupted step
STOP: Discontinuance of the sequence, continuation of the sequential work after a re-start, establishment of the steps which have already been processed and production of the initial conditions for the next step to be processed.

These batch conditions are produced by the digital batch control upon the occurrence of a signal allocated to these batch conditions (switch, computer signal).

Due to the introduction of the batch conditions and batch operating values, continuous and batch control regions may be processed in the manner which has already been described and may be jointly controlled using the control process according to the present invention.

The control regions are combined into groups for the coordination of the control region work by a process computer. In terms of the process, it is a coupling with buffers. It is possible to distinguish three types of groups:

Continuous groups: produced by serial and/or parallel coupling of several continuous control regions;
Batch groups: produced by serial and/or parallel coupling of several batch control regions;
Main groups: produced by serial coupling of batch and continuous groups.

The levels in the coupling buffers and in the control regions of the group operating values and type of operation (commands) are used as logistic control parameters for the groups.

If all the control regions of a continuous group are in the stationary normal condition with the same (group) operating value, all the buffers also have a stationary level. This level is to be calculated such that a sufficient product volume buffer is present for the subsequent control region, as well as a sufficient empty buffer for the product-discharging previous control region. This level is designated the normal buffer level. If one of the group control regions is disturbed, its coupling buffers are filled by the precursors, or are emptied by the successor. Upon falling below or exceeding certain buffer levels, the operating value of the respectively adjacent control regions is reduced to the permissible minimum operating value in order to gain as much disturbance elimination time as possible and to avoid a stopping of the other, undisturbed group control regions as far as possible, which would result, for the most part, in a reduction in the product quality and yield.

By the use of defined operating values and the stationary volume flow which is always given hereby, an optimun continued operation strategy may be planned and carried out for all control regions of the group by determining the flow integrals and by knowing the momentary buffer levels. The optimisation objective lies in all the buffers simultaneously having the normal level upon achieving the group desired operating value within the shortest possible time.

The control parameters resulting from the optimisation calculation are strategy starting times, possibly an extension of the individual operating value stage duration.

The same method is used for the group coordination in starting and load change. Since the contents of the buffers must always be considered, false levels of the buffers which may exist are corrected when carrying out a group strategy. Owing to the operating value method which only allows discrete operating value stages and volume flows established thereby, the optimising planning of the group strategies may be verified very exactly in the installation.

Batch groups are coordinated with continuous groups by the same method. The maximum possible operating value for the previous or subsequent continuous control region may be determined from the remaining operating time of the batch part discharging nearest to the coupling buffer, and from the contents of the coupling buffer, and thus the group operating value may also be determined for the group to which the coupled continuous control region belongs. Batch and continuous groups which are coupled in this manner from an integrated control unit (main group) which is jointly controlled.

The group controls deliver instructions regarding type of operation and operating values to the subjacent control regions. These control instructions are carried out as described by the control regions.

Each control region may have a different type of operation and a different operating value in a group, while carrying out a group strategy and, although the various control region apparatus within the group may have the most varied residence times and run-off speeds, nevertheless the process may be controlled and kept in check in every condition by the control parameter "operating value".

An installation which is constructed according to the present invention is particularly suitable for simulation on an EDP. Thus, before the installation is constructed, all the possible strategies may be tested.

The installation according to the present invention and the control process is illustrated by way of example in the drawings and will now be described in more detail in the following.

BRIEF DESCRIPTION OF THE DRAWINGS

FIG. 8 shows operating value changes during starting of a four-stage installation;

FIG. 9 shows buffer levels during starting of a four-stage installation;

FIG. 15 shows the structuring of a large installation for the production of an aminonaphthol sulphonic acid.

DETAILED DESCRIPTION OF THE INVENTION

Figure 1:
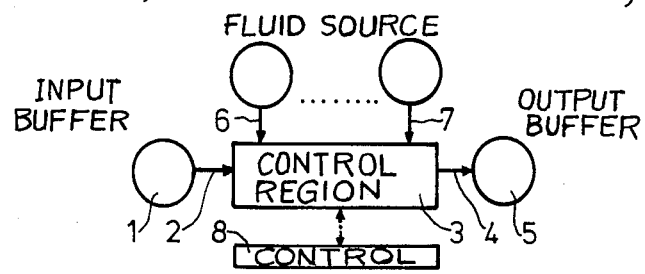
FIG. 1 shows a control region.

FIG. 1 shows an apparatus combination or a process stage of a control region which is controlled in a decentralised manner. A closed divisional function or a process step of the complete process is carried out therewith. An input volume flow 2 enters a control region apparatus 3 from an input buffer 1. An output volume flow 4 flows out into an output buffer 5. The output buffer 5 is identical to the input buffer of the next control region. The box 3 symbolically represents a continuous or batch process. Other volume flows 6 . . . 7 may run into the apparatus 3. The output flow 4 does not need to be identical to the input flow 2. A control region control 8 is allocated to the control region 3, via which the working devices of the control region are operated and controlled. In the case of continuous control regions, the control 8 causes the production of the instructions for the type of operation and the operating value formulations. In the case of batch control regions, it controls the sequential run of working steps.

Figure 2:
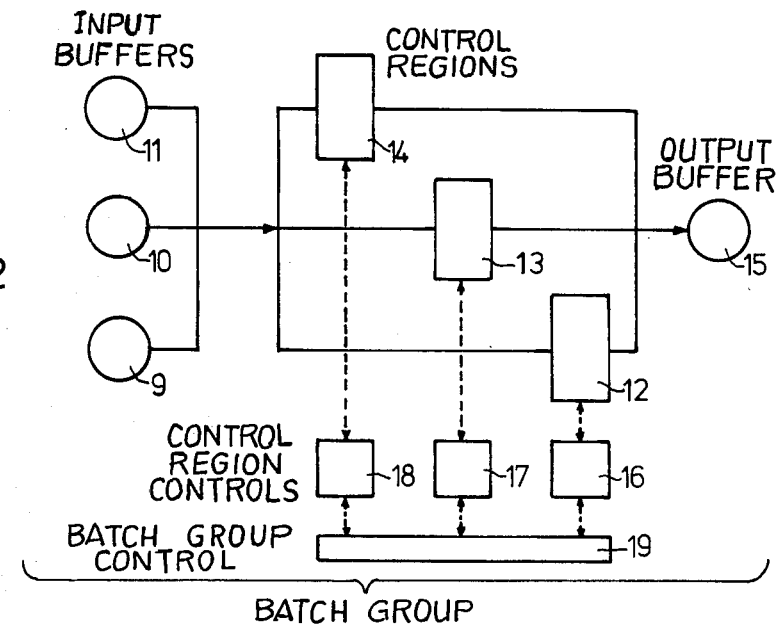
FIG. 2 shows a batch group.
Figure 3:
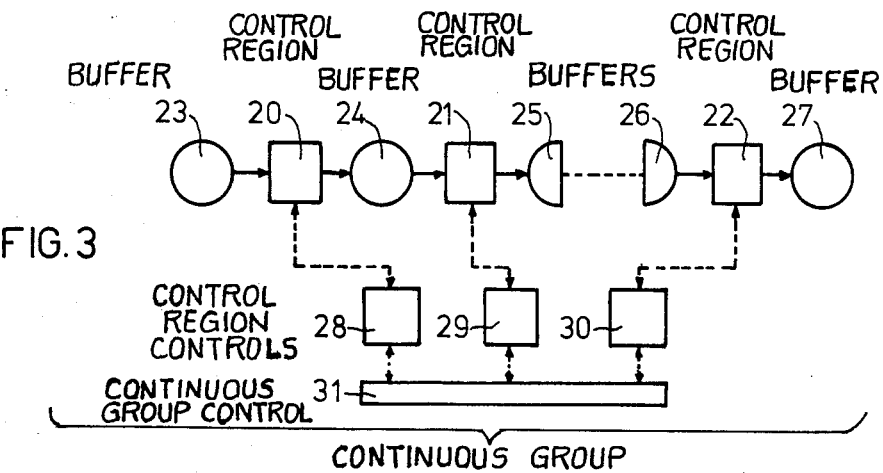
FIG. 3 shows a continuous group.

Control regions which have the same working mode are combined into groups. FIG. 2 shows a group of batch control regions and FIG. 3 shows a group of continuous control regions. The example in FIG. 2 is typical of the charge-wise production of an intermediate product from three starting substances in storage containers 9 to 11, which of course also have a buffer function. A batch process is carried out alternately in the identically constructed control regions 12 to 14. The finished product is discharged in each case into a buffer 15. In some processes, an individual buffer may be dispensed with in batch operation if the discharging stage may also be used as a product store for a certain time (virtual buffer). Control region controls 16, 17, 18 are allocated to the batch control regions. A batch group control 19 coordinates the control region controls.

FIG. 3 shows a serial sequence of continuous control regions 20 to 22 with buffers 23 to 27. These buffers are designated as tactical working buffers. A flow decoupling is possible thereby. Groups of this type are also controlled in a decentralised manner by a continuous group control 31 which acts on continuous control region controls 28 to 30.

Figure 4:
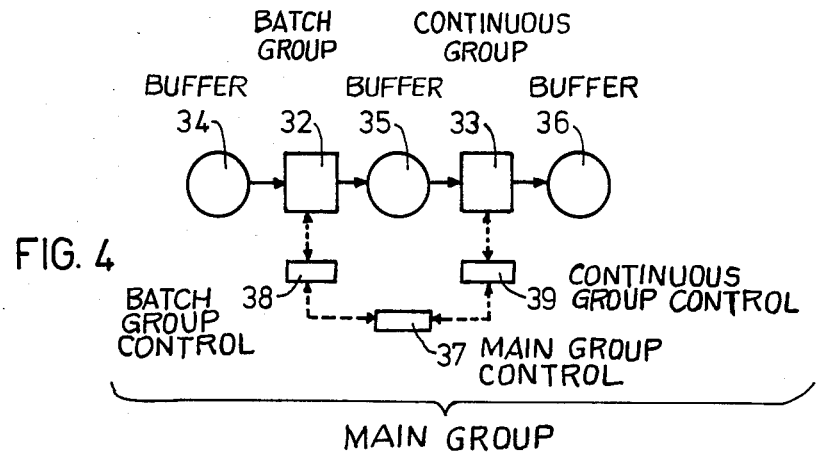
FIG. 4 shows a main group.

In FIG. 4, a batch group 32, similar to the one in FIG. 2, and a continuous group 33, similar to the one in FIG. 3, are combined into a main group. The batch group 32 is decoupled by an input buffer 34 to a precursor group and by a buffer 35 towards a continuous group 33. This is terminated by an output buffer 36. The main group control 37 coordinates the batch group control 38 and the continuous group control 39 by type of operation and operating value commands.

Figure 5:
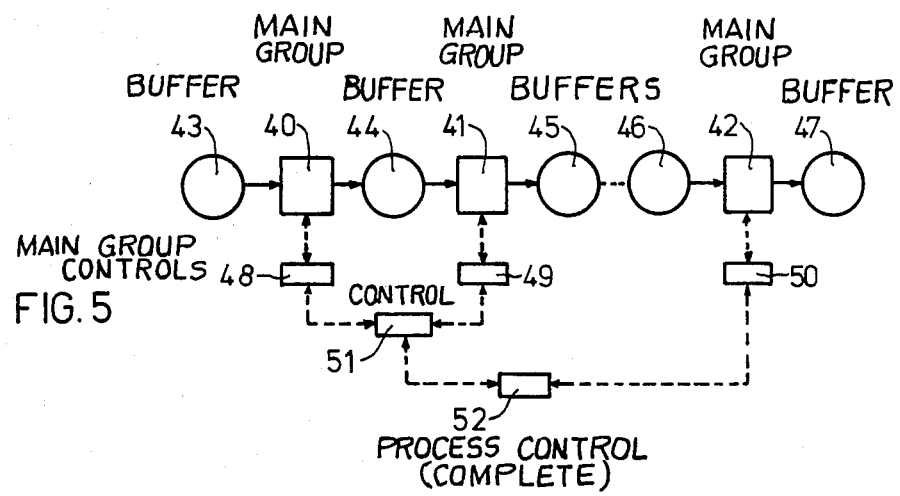
FIG. 5 shows a central process control.

FIG. 5 schematically shows a complete process. Buffers 43 to 47 are positioned upstream of, between and downstream of main groups 40 to 42 and they are selected to be large enough for a very strong decoupling to be effected (strategic buffers). Here again, group controls 48 to 50 are shown schematically. Two groups 48, 49 are combined in this specific case into a main group which is controlled by a control 51. The complete process is controlled centrally by a process control 52.

Operating value restrictions which are conditioned by the apparatus and the process occur in control regions as well as in groups. The maximum operating value of a control region determines in the same way the maximum operating value of the group , or the quasi-operating value of batch groups depends on the number of available batch stages.

Figure 6:
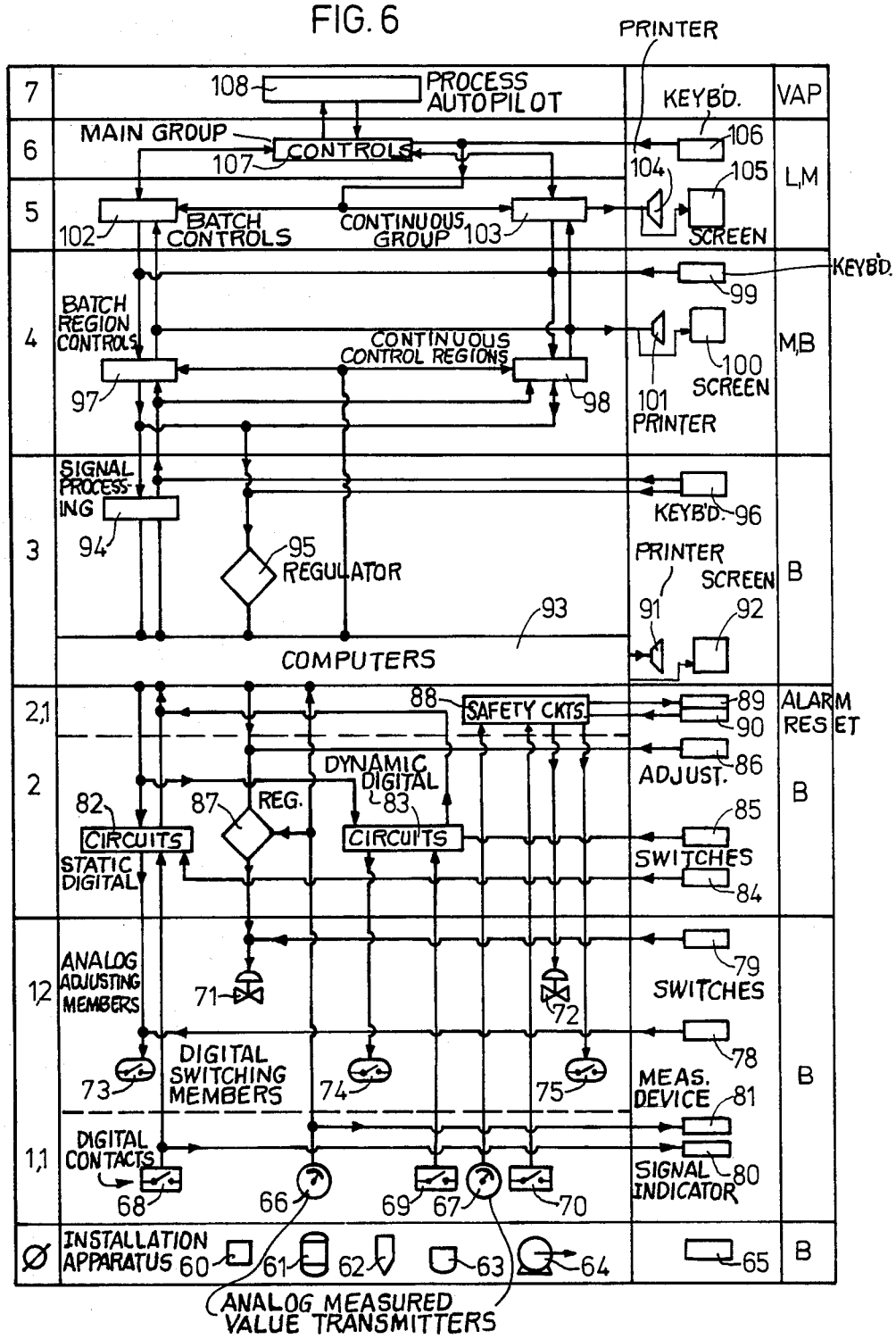
FIG. 6 shows the hierarchical control structure.

FIG. 6 generally shows the organisation of the control process. Seven hierarchical stages may be distinguished (lefthand column). The middle column represents by way of example the apparatus on which the process control acts. It may be seen from the righthand column who is usually operative during manual operation. Today, an EDP is used as much as possible in a production installation. In the installation and the control process according to the present invention, a considerable advantage is seen in the fact that the manual operation must be structured in the same way as the automatic operation, which is generally possible in this way for any process.

All the apparatus of the installation are located with their manual operation members (various symbols with reference numerals 60 to 64) at the lowest level 0 in FIG. 6. Any interventions into the function of the apparatus may only be carried out manually by the personnel (B) at the operating members (65) of the apparatus.

In the first hierarchy stage (1) are located measurement and intervention devices, the operation of which may be controlled and influenced by a remote measurement station or measurement control room. Analog measured value transmitters 66, 67 and digital contacts 68 to 70 are represented by way of example in section 1.1 and are allocated to the individual apparatus in stage 0.

Section 1.2 contains analog adjusting members 71, 72 (regulating valves, servomotors) and digital switching members 73 to 75 which, in turn, are allocated to the apparatus of the first stage.

Manual interventions by the operation (B) on digital switching members are possible with switch 78 and analog adjustments of the analog adjusting members are possible with switch 79. Measurement devices 81 and a signal indicator board 80 are available to him for information.

The conventional discrete information processing is located in the next hierarchy stage (2). the measurement signals of stage 1 are processed into position signals applied to digital switching members 73, 74 in static digital circuits 82 and dynamic digital circuits 83, the control 83 producing sequences of signals which cause a stepwise change in the switching and apparatus conditions in stage 0.

The operator (B) can perform individual signal connections via switches 84, and may initiate switching sequences via switches in 85. He can set desired values for a regulator 87 using an adjusting device 86.

Independent safety circuits 88 are positioned in stage 2.1 and they interact with their own measurement value transmitters 67, digital switching members 75, digital contacts 70 and adjusting members 72. The safety condition is indicated by an alarm indicator board 89 and alarm interventions may be re-set using a reset device 90.

All measurement and position signals of stage 1 and all working messages of stage 2 are passed on to stage 3 in which these signals are processed centrally. Working and disturbance printouts are issued to the operating personnel (B) by a screen 92 or a printer 91. This central processing takes place in the base system of one or more computers 93. Said system also contains all the relevant devices 94 for processing and evaluating digital signals as well as regulators which are used for correcting the external regulators 87 in stage 2 or for the direct control of the adjusting values 71. Desired values for the regulators 95 and commands for the digital evaluation 94 are fed in by the operating personnel on a keyboard 96.

Batch control region controls 97 and the controls of continuous control regions 98 are contained in stage 4. They receive from stage 3 all the measurement and working signals which they require. They also contain commands about the type of operation and operating values via a keyboard 99 by the personnel (master or operator M, B). The controls process them into regulator desired values and digital switching signals and convey them on time for implementation to the regulators and digital controls of stage 3 which, in turn, transmit them to the implementing discrete devices of the hierarchy stage 2. The controls inform the personnel about their operating condition and about the complete condition of the control region via a screen 100 and a printer 101.

The group controls of region 5 coordinate the work of the control regions of stage 4. They determine the type of operation and operating values for the control regions subordinated thereto from the working condition messages, buffer level signals and commands of type of operation and group operating value from the personnel (conductor or master L, M), and cnvey them on time for implementation, Depending on the method, group controls for batch groups 102 and continuous groups 103 are present. Working and condition messages are issued via a screen 105 and a printer 104. A main group control 107 is positioned in stage 6 which coordinates the batch and continuous groups and jointly controls them. The group operating value and the type of group operation is established in each case from working signals of the group control and from direct measurement signals of the process (buffer levels). According to these control directions, the group controls 102, 103 determine the types of operation, operating values and starting times which are implemented by the control region controls 97 and 98. The main group operating values are determined and fed in by the personnel using a keyboard 106.

The complete process control (process autopilot, VAP) is located in stage 7. This control 108 surveys main group operating values and buffer levels and determines therefrom maximally permissible operating values for the main group controls.

Figure 7:
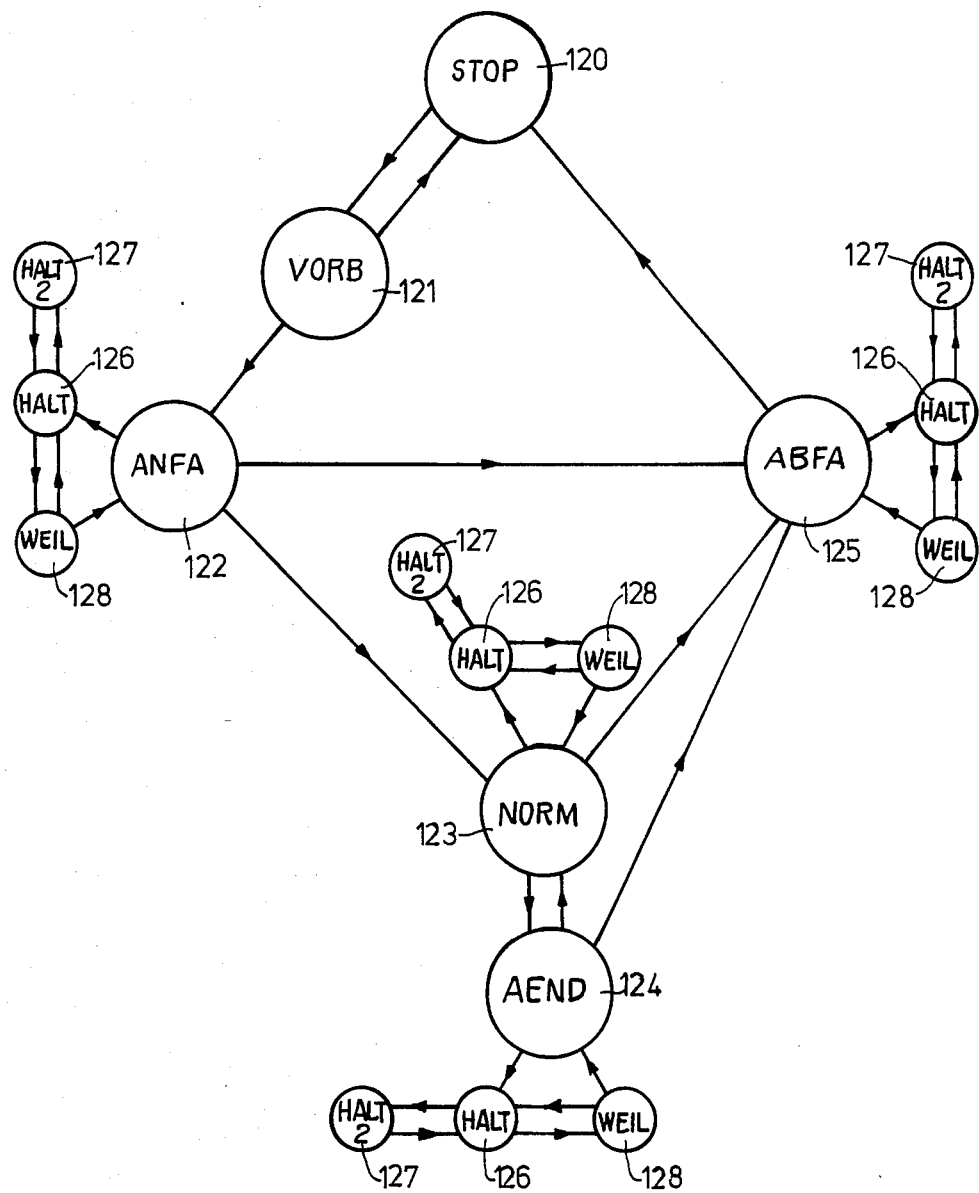
FIG. 7 shows the permissible sequence of types of operation in a continuous process.

FIG. 7 represents all the permissible types of operation (process conditions) and all the permissible sequences of these types of operation for a continuous process.

In the (STOP) operation type 120, the apparatus is at a standstill. This is the condition before the app;aratus is put into operation and after the apparatus has been stopped or emptied. No control measurements are taken. In this condition, the installation may be cleaned and serviced by the personnel. The only permissible following operation type is (VORB) 121.

This operation type, (VORB) 121, relates to the putting into operation of the apparatus. Above all, it involves working by the personnel: condition control of the apparatus, pre-adjustment of manual valves, connection of pumps, stirrers, etc., filling the apparatus with solvents, connection of regulators and digital controls, etc. In this type of operation, the computer has supporting functions. It may be useful to support the control region in this type of operation by a sequential control program. Decisive factors for this purpose are, above all, safety considerations in very complex starting up instructions. During the running time of the type of operation 121, the working control may be transmitted to the sequential control program. At the end of this program sequence, the control is returned to the continuous control. The permissible subsequent operation types are (STOP) 120 and (ANFA) 122.

In the operation type (ANFA) 122, the actual process is started. The substance flow commences and the reaction starts during reaction stages. The operating value of the initial condition is 0 and the objective operating value is arbitrary within the permissible working range. The work commences with an operating value strategy. Commencing with a starting operating value, the working and operating value condition is moved up to the desired operating value in fixed operating value jumps. The jump duration of each operating value stage is conditioned by the formulation and by the size of the apparatus. A change in the operating value is only possible after the normal condition signal has been checked. The optimum jump duration may be determined by the computer from the working volume of the apparatus and from the output volume flow over a residence time function. The operation type (ANFA) 122 is complete when the desired operating value has been achieved, The prescribed jump time has expired and when the normal condition signal is present. The normal signal is formed by linking relevant measurement signals in the computer and it characterises the observance of the working conditions which are characteristic of the stationary condition over a certain time. If these conditions have been met, the (ANFA) type operation 122 is terminated and replaced by the (NORM) type operation 123. With the (ANFA) operation type 122, the stationary working condition is achieved with a certain operating value, starting from an apparatus which does not contain any product.

When starting control regions from several coupled apparatus, a complete starting strategy must be carried out. This depends on the number of reactors of the group, on the working volumes of all the reactors of the group, on the starting volume in the reactors, on the output flow of all the reactors with nominal capacity and on the working volume and input flow of the residence time—determining reactor. The only possible subsequent operation types which may be produced by command are (HALT) 126 or (ABFA) 125.

The (NORM) type operation 123 differs from all the other types of operation in that it cannot be deliberately produced, by a command. It can only be achieved at the end of another operation type, namely (ANFA) 122, (AEND) 124 or (WEIL) 128. The (NORM) operation type 123 includes all the stationary conditions for all the possible operating values. The possible subsequent operation types are (AEND) 124, (HALT) 126 and (ABFA) 125.

A change in load is only possible by the (AEND) operation type 124 from (NORM) 123. Starting from a stationary condition with a fixed operating value, a new stationary condition is produced having a changed operating value. If the new operating value is higher than the old value, a strategy is carried out. In the case of a new objective operating value which is lower than the old value, a jump is carried out without jump waiting time, because a safe installation condition is always produced in the event of a reduction in the operating value. As in the case of (ANFA) 122, the (NORM) operation type 123 is also produced in the same way for (AEND) 124 at the end of the strategy. Possible subsequent operation types are again (HALT) 126 and (ABFA) 125.

The (HALT) operation type 126 interrupts all the working operation types (ANFA) 122, (NORM) 123, (AEND) 124, (WEIL) 128 and (ABFA) 125. It is introduced by a direct command, through a programmed command which is based on the checking of external and programmed signals (for example, a HALT in the precursor or successor control region may produce a HALT) or by a disturbance signal of the installation. A HALT causes an interruption in the product flow towards and out of the apparatus. The actual working procedure is interrupted thereby. However, in the HALT operation type, the physical working conditions are retained. During short term disturbances, the process can be continued withou a loss of time. It should be noted that an interruption in the substance supply in a reaction stage does not usually means an interruption in the chemical reaction. This continues, slowing down, when there is a change in the stationary substance concentrations, the internal condition of the substance content changing, depending on time, and a continuation of the working operation becoming increasingly difficult. When continuing with a progressing disturbance duration, a start must always be made from an always less defined initial condition. In order to prevent this, the physical conditions may be changed using a type of operation (HALT 2) 127, for example by means of a reduction in temperature or pressure. Possible types of operation after (HALT) 126 are (HALT 2) 127, (WEIL) 128 and (ABFA) 125.

In the (HALT 2) operation type 127, process parameters are also changed. The possible subsequent operation type is (HALT) 125.

The condition of each operation type interrupted by (HALT) 126 is reproduced by the operation type (WEIL) 128. The objective operating value is the operating value before the interruption. However, in the case of a comparatively long interruption duration, the apparatus condition may be changed to such an extent that the condition which has been left can no longer be achieved. In this case, the condition must be reconstructed anew with a quasi-starting strategy. Possible subsequent operation types are (HALT) 126 and (ABFA) 125.

(ABFA) 125 may be introduced starting from each type of "working" operation. The measures in this type of operation are almost identical to those of the operation type (HALT) 126. However, if during (HALT) the output flow is blocked from the apparatus simultaneously with the blocking of the input flow, this output is maintained during (ABFA) 125 until the apparatus is empty. The following control regions remain in their former operation type without a change of the operating value and they further process, in a normal manner, the product discharged from the stopping control region. If the apparatus of the control region has been emptied of usable products, the stopping operation is terminated by introducing the operation type (STOP) 120 (with a command). Only when the preceding control region is in (STOP), can a stop command be given for a control region. The physical conditions are maintained until the end of the procedure.

FIGS. 8 and 9 represent by way of example a starting procedure in a continuous group of four continuous control regions. The time is plotted in minutes on the abscissa, and the strategy-stages operating values of the control regions are plotted on the ordinate. According to the present invention, the operating value may only change in discrete stages. The step curves 130 to 133 give the operating value/time strategies in the control regions 1 to 4. The minimum duration in one operating value stage is 3.5 times the residence time in the corresponding control region apparatus.

The buffer levels connected downstream of each control region are represented in FIG. 9, according to the operating value strategy in FIG. 8. When starting up, all the buffers are of course empty. In this specific example, the normal level of the buffer after the control region 1 and after the control region 4 is 500 l in each case, after the control region 2, 600 l and after the control region 3, 800 l. The normal buffer levels are represented by the broken lines 140 to 142. By the choice of the strategy beginning and by an extension of the running time of the first operating value jump in the control regions 1 to 3, all the buffers have the normal level at the end of all the control region strategies. The curves for the volume level in the buffers from 135 to 138 in FIG. 9 should point in their line pattern to the operating values in FIG. 8 which are indicated similarly in dashes.

Figure 10:
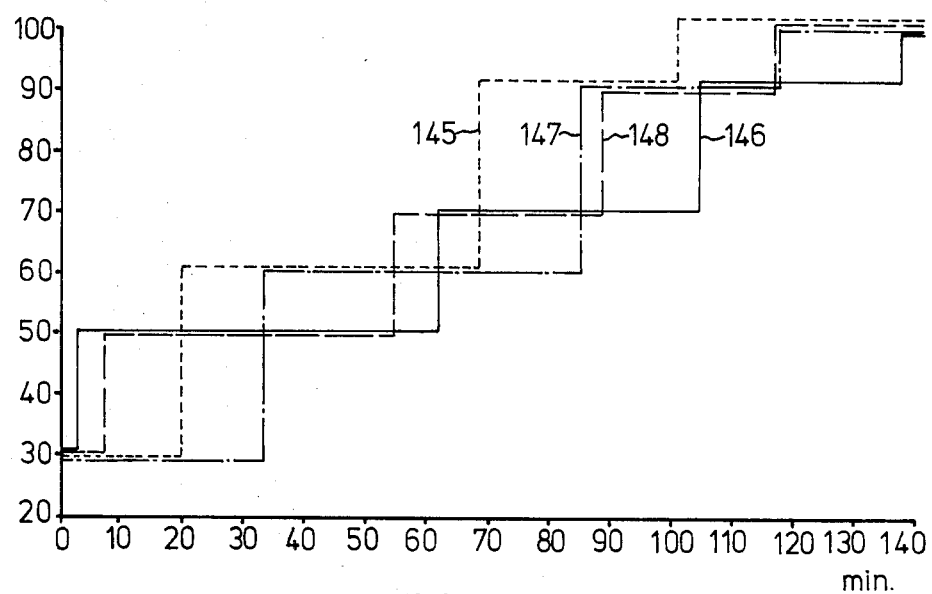
FIG. 10 shows operating value changes in a load change of a four-stage installation.
Figure 11:
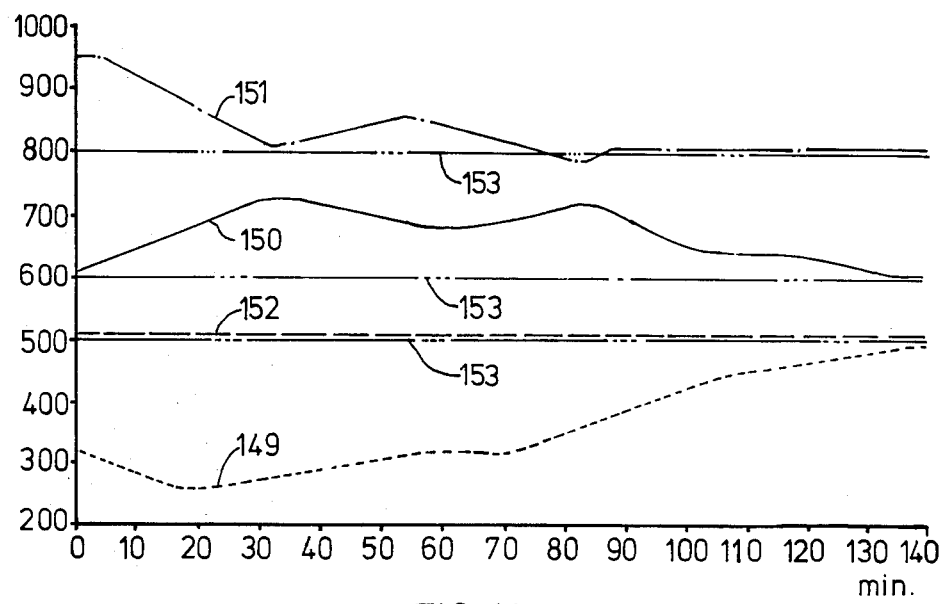
FIG. 11 shows buffer levels during a load change of the four-stage installation.

FIGS. 10 and 11 represent a load change procedure in a four-stage installation. The operating value 100 is to be achieved starting from the operating value 30. It is also to be shown as a peculiarity in this example that although the output buffers for the control regions 2 and 4 lie within the normal region, the buffer for the control region 1 is to be lower than, and the buffer for the control region 3 is to be higher than the normal buffer level. The type of operation load change is introduced at time 0. All four control regions are in the operating value 30 and the step-like operating value stages are designated by 145 to 148 for the control regions 1 to 4.

The time fluctuations in the output buffer levels of the four control regions are represented in FIG. 11 (curves 149 to 152, with the same symbols as in FIG. 10). The normal buffer volume for the output buffers of the control regions 1 and 4 amounts to 500 l (153), for the control region 2, 600 l (154) and for the control region 3, 800 1 (155). In the operating value strategy which is represented in FIG. 10, a level correction of the buffers downstream of the control regions 1 and 2 is also achieved after 140 minutes.

Figure 12:
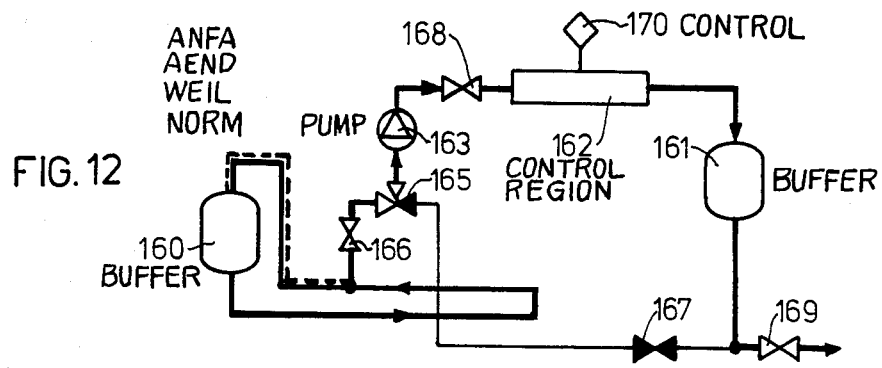
FIG. 12 shows a flow path connection in the NORM operation type.
Figure 13:
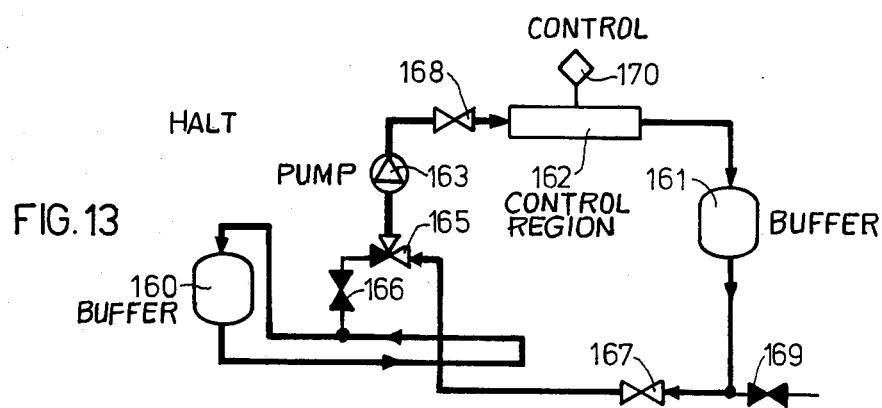
FIG. 13 shows a flow path connection in the HALT operation type.
Figure 14:
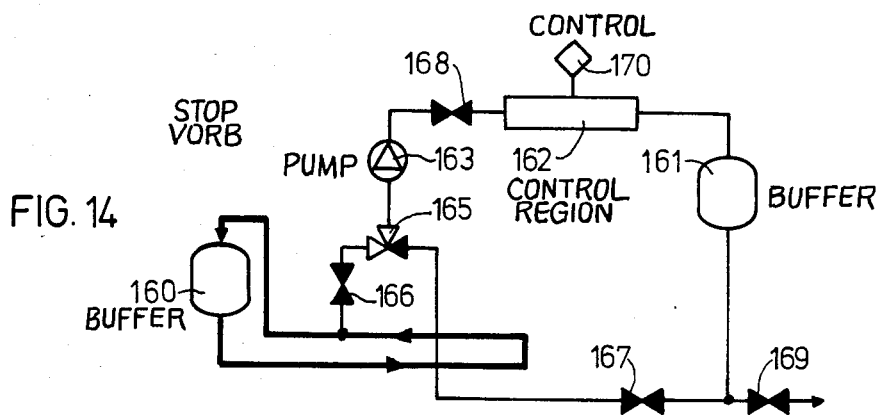
FIG. 14 shows a flow path connection in the STOP operation type.

An example of different flow paths in different types of operation is represented in FIGS. 12 to 14. This is a quite simple control region, in which the input flow from the input buffer 160 is identical to the output flow in the output buffer 161. The control region 162 is a high pressure apparatus comprising many individual apparatus. Moreover, a high pressure feed pump 163 and a few valves 165 to 169 are also represented. The rhombus 170 characterises control loops in the working apparatus, with which the physical working conditions in the apparatus are produced according to the formulation for all the operating values and types of operation.

In FIG. 12, the control region works in an active operation type (ANFA), (AEND), (WEIL) and (NORM). The flow path is shown in thick lines. The charged volume flows from a buffer 160 via valves 166 and 165 to a metering pump 163 and from there, via a valve 168, into the working apparatus 162. It passes from there into a buffer 161 and may be diverted via a valve 169. The flow path is determined by the following switching conditions: The valves 166, 168 and 169 are open, directional control valve 165 is in the state shown, valve 167 is closed, pump 163 and regulator 170 are switched on.

FIG. 13 shows the flow path for the operation type (HALT). There is no input or output flow. However, all the working conditions are maintained. The volume flow within the control region apparatus belongs thereto. Working temperatures and working pressure are maintained. The inlet valve 166 is closed and the directional control valve 165 is reversed. The check valve 167 is open and the discharge valve 169 is closed. The pump 163 and regulator 170 remain switched on.

FIG. 14 shows the flow path for the operation types (STOP) and (VORB). There is no volume flow. The installation is not operating. The valves 166, 167, 168 and 169 are closed and valve 165 is in the state of FIG. 14. The pump 163 and the regulator 170 are switched off.

An example of the construction of a large installation is represented in FIG. 15. This is an installation for the production of an aminonaphtholsulphonic acid. The installation is formed from four main groups. The first main group comprises an apparatus between boxes 200 and 224. The circuit 200 symbolises all the supply vessels (buffers) which contain the charging materials for the batch control regions 201, 202, 203 and 204. A naphthalene trisulphonic acid is produced in step sequences in these batch control regions.

The individual batch control regions are controlled by digital course controls 205 to 208. A control 205 to 208 is allocated to each control region 201 to 204. A batch group control 209 coordinates the work of the control regions 201 to 204 which are combined into a batch group. It determines the beginning for the control regions and regulates the discharge of finished product to a buffer 210. In this example, the buffer 210 is a virtual buffer, i.e., a particular buffer vessel is not provided, but the control region apparatus which contain finished product are used as buffers in each case.

The input volume flow for the following continuous group issues from the buffer 210. This following continuous group comprises a nitriding apparatus 211, a nitrose explusion and gypsum precipitation step 212, a gypsum filtration step 213 and a chalk precipitation step 214. The control regions 211 to 214 are decoupled from one another by buffers 215 and 217 and are controlled independently by the control region controls 218 to 221.

The continuous group control 222 takes over the coordination of the control region controls. The type of operation and operating values are assigned as control variables to the individual control regions by said continuous group control 222.

Batch and group controls are coordinated by the main group control 233 which establishes the group operating values. For this, it uses information from the batch-, continuous group control and operating value instructions of the process autopilot 223a. The last control region gives its working flow to the buffer 224.

The second main group is formed from the batch control regions 225 and the continuous control regions 226, 227 and 228 which are controlled by the continuous control region controls 229 and 231. The batch control region 225 has a course control 232.

The control regions are decoupled from one another by buffers 233 to 236. Decoupling from the adjacent main groups is effected by an input buffer 224 and an output buffer 237. The work of the group fromed from the control regions 226 to 228 is carried out by the group control 238 in the manner which has been described in the case of the main group 1, and the main group control 239 comsiders a possible operating value restriction of the process control (VAP) 223a in a group operating value for the continuous group control 228. The second main group represents a high pressure hydrogenation installation. In the control region 226, the charging mixture is produced from different components. The batch control region 225 supplies some of these components. The product which has been produced runs into a buffer 235. In the control region 227, the charging mixture is treated with hydrogen at an elevated temperature and under elevated pressure and thereafter is transferred into a buffer 236 under reduced pressure. In the control region 228, the catalyst which is added in the control region 226 is removed from the product of the buffer 236 by a multi-stage filtration and is again made available to the control region 226, via a decoupling buffer 234, the product freed from catalyst flowing towards the output buffer 237.

The third main group is formed from the continuous control region 240 and to the two parallel batch control regions 241 and 242 which, moreover, are linked serially in each case to a subsequent batch stage 243, 244. A control region control 245, 246, 247 is used for the continuous control region and for each serial both link.

Coordination is carried out in the manner which has already been described by continuous group control 248, the batch group control 249 and the main group control 250.

The product which comes from the input buffer 237 is concentrated in a multi-stage evaporation installation 240, the discharging volume flow being taken up by the buffer 251. The batch control regions 241 and 242 are charge clockwise from this buffer and the product is treated in these regions with sodium hydroxide at a comparatively high temperature and under a comparatively high pressure. In the batch stages 243 and 244 which are connected downstream serially, the product from 241 and 242 is depressurised, cooled, diluted and discharged periodically to a buffer 252.

The fourth main group is formed from the continuous control regions 253 to 256 which are decoupled from one another by buffers 257 to 259. The controls 260 to 263 are allocated to the continuous control regions. Said controls 260 and 263 are coordinated by the continuous group control 264 in the manner which has already been described. Furthermore, the main group control 265 considers the work of the batch group 249 belonging to the preceding main group 3, and instructions of the process control 223a and it derives therefrom group operating values for the continuous group control 265.

In the control region 253, in the flow coming from the buffer 252, the product contained therein is precipitated by the addition of acid at a relatively high temperature and gaseous by-product is expelled. The volume flow is cooled by vacuum cooling in the control region 254. In the control region 255, the precipitated solids are isolated by filtration and dried in an atomising dryer in the control region 256, and packed for the solids store 266.

What is claimed is:

1. In a process for controlling a chemical production installation for carrying out a complete process which permits division into a plurality of regions of predetermined volume flows and modes of operation, comprising:
   dividing the complete process control into control regions each having a plurality of modes of operation and in which the desired volume flow of each control region is predetermined;
   decoupling the control regions from each other by providing input and output buffers for the volume flow therebetween;
   controlling each control region independently of the other control regions by specifying a single one of the plurality of modes of operation and a single one of a plurality of operating values, wherein each control region has a predetermined flow path corresponding to each mode of operating and predetermined process parameters corresponding to each operating value.

2. The process according to claim 1, wherein the step of controlling comprises providing a waiting time preceding a change in operating value.

3. The process according to claim 1, wherein the step of controlling comprises changing the operating value or a control region to a new value unless one of the following conditions exists: the input buffer level is less than a given level, the output buffer level is higher than a given level, the change is greater than a given amount, the time interval from previous change is less than a predetermined waiting time and the process parameters are not equal to the predetermined process parameters of the current operating value.

4. The process according to claim 3, wherein the step of controlling comprises providing a waiting time preceding a change in operating value of a control region which is 3 to 5 times the residence time of the largest component in the control region or 3 to 5 time the delay time of a regulator for the ocntrol region.

5. The process according to claim 1, wherein the plurality of operating values are graduated in discrete steps of at least 5 with an operating value of 100 corresponding to the full capacity of the complete process.

6. The process according to claim 5, wherein the operating values are graduated in discrete steps of from 10 to 30.

7. The process according to claim 1, further comprising connecting several of the control regions both serially into continuous groups and in parallel into batch groups, decoupling the groups by providing buffers therebetween and controlling each group independently of the other groups.

8. In a process for controlling chemical production installations, in which divisional functions are carried out in at least one of continuous and batch control regions, an operating value and type of operation of which is changable, and these control regions cooperate at least one of serially and in parallel, the improvement comprising: decoupling each control region in terms of volume flow and controlling each control region independently; preselecting only the type of operation and the operating value selected from a discrete number of operating value states for each control region; changing all the process-conditioned process parameters and flow paths at each operating value or in the event of each change in the type of operation, according to a formulation; introducing changes in the operating value with respect to the operating value step height and the step waiting time, restricted by the hprocess, only from a quasi-stationary condition and if it is not prevented by the buffer levels upstream and downstream of the control region, and producing a signal representing the quasi-stationary condition of a control region which occurs for a sufficient length of time and when all the working parameters of the control region lie within the process-conditioned, pre-given normal condition limits.

9. A process according to claim 8, further comprising connecting several control regions together into a group, decoupling the group in terms of volume flow from adjacent groups, preselecting only the type of operation and the desired operating value selected from a discrete number of operating value stages for the group, operating all the control regions of this group are by a process control system, according to the type of operation and the operating value objective of the group in an adapted type of operation and in the same operating value state; changing the process-conditioned process parameters and flow paths of all the control regions in the event of changes in the type of operation or in the desired operating value of the group, by the process control system, according to the formulation; introducing increases in the operating value step height and the jump waiting time restricted by the process, only from a quasi-stationary condition within the group and if it is not prevented by the buffer levels upstream and downstream of the group; and producing a signal representing the quasi-stationary condition of the group which occurs for a sufficient length of time and if all the working parameters of the group lie within the process-conditioned normal condition levels.

10. A process according to claim 9, further comprising fixing the operating value of a group automatically, depending on the level of the input and output buffer upstream and downstream of the group.

11. A process according to claim 8, further comprising instigating the control work of the independent devices in the control region by control directions from a process control system.

12. A process according to claim 8, further comprising fixing the operating value of a control region automatically, depending on the level of the input and output buffer.

13. A process according to claim 8, further comprising setting the jump waiting time by one of from 3 to 5 times the residence time of the largest container within the control region and from 3 to 5 times the longest dead time of a regulating device which is used in the control region.

* * * * *